US011287573B1

(12) United States Patent
Zhang et al.

(10) Patent No.: US 11,287,573 B1
(45) Date of Patent: Mar. 29, 2022

(54) HETEROGENEOUSLY INTEGRATED PHOTONIC DEVICES WITH IMPROVED OPTICAL COUPLING BETWEEN WAVEGUIDES

(71) Applicants: Chong Zhang, Santa Barbara, CA (US); Hyun Dai Park, Goleta, CA (US); Minh Tran, Goleta, CA (US); Tin Komljenovic, Santa Barbara, CA (US)

(72) Inventors: Chong Zhang, Santa Barbara, CA (US); Hyun Dai Park, Goleta, CA (US); Minh Tran, Goleta, CA (US); Tin Komljenovic, Santa Barbara, CA (US)

(73) Assignee: Nexus Photonics LLC, Santa Barbara, CA (US)

( * ) Notice: Subject to any disclaimer, the term of this patent is extended or adjusted under 35 U.S.C. 154(b) by 0 days.

(21) Appl. No.: 17/078,859

(22) Filed: Oct. 23, 2020

Related U.S. Application Data

(60) Provisional application No. 63/093,440, filed on Oct. 19, 2020.

(51) Int. Cl.
*G02B 6/122* (2006.01)
*G02B 6/14* (2006.01)
(Continued)

(52) U.S. Cl.
CPC ........... *G02B 6/14* (2013.01); *G02B 6/12004* (2013.01); *G02B 6/1228* (2013.01); *G02B 6/131* (2013.01);
(Continued)

(58) Field of Classification Search
CPC ................................................... G02B 6/1228
See application file for complete search history.

(56) References Cited

U.S. PATENT DOCUMENTS

| 6,083,843 A * | 7/2000 | Ohja ..................... G02B 6/30 216/24 |
| 7,539,373 B1 * | 5/2009 | Logvin ............ G02B 6/12004 385/28 |

(Continued)

FOREIGN PATENT DOCUMENTS

| DE | 4306510 A1 * | 8/1994 | ............ H02J 7/1438 |
| WO | WO-2008014606 A1 * | 2/2008 | ........... G02B 6/1228 |

*Primary Examiner* — Charlie Y Peng
(74) *Attorney, Agent, or Firm* — Shalini Venkatesh

(57) ABSTRACT

An optical device comprises first, second and third elements fabricated on a common substrate. The first element comprises an active waveguide structure supporting a first optical mode, the second element, fabricated on a planarized top surface of the first element, comprises a passive waveguide structure supporting a second optical mode, and the third element, at least partly butt-coupled to the first element, comprises an intermediate waveguide structure, positioned such that a top surface of the intermediate structure underlies a bottom surface of the passive waveguide structure. If the first optical mode differs from the second optical mode by more than a predetermined amount, a tapered waveguide structure in at least one of the second and third elements facilitates efficient adiabatic transformation between the first optical mode and the second optical mode. Mutual alignments of the first, second and third elements are defined using lithographic alignment marks.

9 Claims, 5 Drawing Sheets

(51) Int. Cl.
*G02B 6/13* (2006.01)
*G02B 6/12* (2006.01)
*G02B 6/132* (2006.01)

(52) U.S. Cl.
CPC ...... *G02B 6/132* (2013.01); *G02B 2006/1209* (2013.01); *G02B 2006/12152* (2013.01)

(56) References Cited

U.S. PATENT DOCUMENTS

| | | | |
|---|---|---|---|
| 9,270,078 B2* | 2/2016 | Rickman | H01S 3/08027 |
| 10,641,959 B1* | 5/2020 | Park | G02B 6/1228 |
| 10,718,898 B1* | 7/2020 | Park | G02B 6/12004 |
| 2002/0097941 A1* | 7/2002 | Forrest | H01S 5/0265 |
| | | | 385/1 |

* cited by examiner

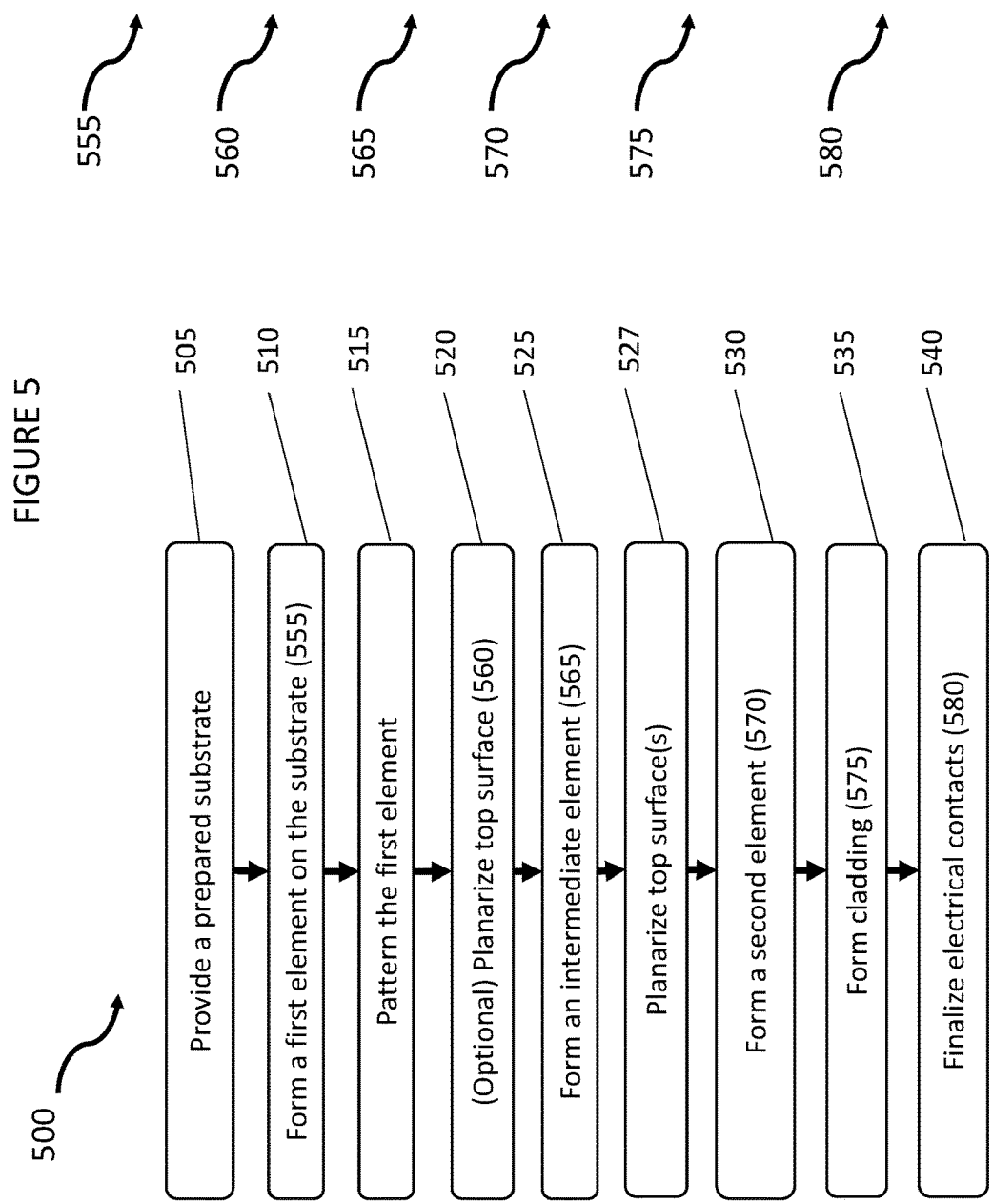

HETEROGENEOUSLY INTEGRATED PHOTONIC DEVICES WITH IMPROVED OPTICAL COUPLING BETWEEN WAVEGUIDES

FIELD OF THE INVENTION

The present invention relates to semiconductor processing. More specifically, certain embodiments of the invention relate to a method and system for realization of photonic integrated circuits using dissimilar materials that are optically coupled.

BACKGROUND OF THE INVENTION

A photonic integrated circuit (PIC) or integrated optical circuit is a device that integrates multiple photonic functions and as such is analogous to an electronic integrated circuit. The major difference between the two is that a photonic integrated circuit provides functions for information signals imposed on optical carrier waves.

PICs can be realized in a number of material systems, generally determined by the wavelength of operation, such as those based on indium phosphide (InP), gallium arsenide (GaAs), or gallium nitride (GaN) which are direct bandgap materials capable of efficient light generation. Other PICs can be realized by indirect bandgap materials such as e.g. silicon (Si) or dielectrics such as e.g. silicon nitride (SiNx), aluminum oxide (Al2O3), lithium niobate (LiNbO3) or others. Often, a single material system does not provide complete functionality (low propagation loss, high or low confinement in the waveguide, electrically pumped optical gain, efficient modulation, etc.) or parts of that functionality provide sub-optimal performance. The materials of different material systems can differ in temperature of growth/deposition, thermal expansion coefficients and/or other parameters.

This problem is generally solved by assembling PICs comprising two or more chips made from dissimilar materials in separate processes. Such an approach is challenging due to a need for very fine alignment, which increases packaging costs and introduces scaling limitations. Another approach to solving the problem is to bond dissimilar materials and process them together, removing the need for precise alignment and allowing for mass fabrication. In this disclosure, we use the term "hybrid" to describe the first approach that includes precise assembly of separately processed parts, and we use the term "heterogeneous" to describe the latter with no precise alignment necessary.

Standard heterogeneous integration is very powerful, but might be challenging in some materials combinations due to a variety of reasons including small native wafers (limiting the total available material, as in e.g. native GaN), problems related to bonding surface quality (e.g. thick buffer layer growth resulting in increased surface roughness), problems relating to substrate removal (e.g. absence of appropriately selective etches) and/or others.

A second limitation of standard heterogeneous integration arises from a limitation in the smallest feature size that can readily be fabricated. To transfer the optical signal between dissimilar materials, the heterogeneous approach utilizes tapers whose dimensions are gradually reduced until the effective mode refractive indices of dissimilar materials match and there is efficient power transfer. This approach generally works well when materials have similar refractive indices as is the case with silicon and InP. In cases where there is a larger difference in effective indices, such as between e.g. SiN and GaAs, the requirements on taper tip dimensions become prohibitive, limiting efficient power transfer. Specifically, extremely small taper tip widths (of the order of nanometers) may be necessary to provide good coupling. Achieving such dimensions is complex and may be cost prohibitive.

There remains, therefore, a need for methods that provide efficient optical coupling between materials with dissimilar refractive indices, without requiring prohibitively narrow taper tips, and that can be achieved using a fabrication process capable of handling large wafers. This would allow for scalable integration of various materials for the realization of PICs. Ideally, PICs made by such a method would operate over a wide wavelength range from ultra-violet (UV) to infra-red (IR) and be able to handle the high optical powers needed for many applications.

SUMMARY OF THE INVENTION

The present invention includes devices and methods for providing practical and efficient optical coupling between elements comprising materials of different refractive indices, with particular relevance to integrated PICs.

In one embodiment, an optical device comprises first, second and third elements fabricated on a common substrate; wherein the first element comprises an active waveguide structure supporting a first optical mode, the second element, fabricated on a planarized top surface of the first element, comprises a passive waveguide structure supporting a second optical mode, and the third element, at least partly butt coupled to the first element, comprises an intermediate waveguide structure, positioned relative to the passive waveguide structure such that a top surface of the intermediate structure underlies a bottom surface of the passive waveguide structure.

In this embodiment, if the first optical mode differs from the second optical mode by more than a predetermined amount, a tapered waveguide structure in at least one of the second and third elements facilitates efficient adiabatic transformation between the first optical mode and the second optical mode. Mutual alignments of the first, second and third elements are defined using lithographic alignment marks.

In another embodiment, a method for making an optical device comprises: forming a first element, comprising an active material, on a substrate; defining an active waveguide, configured to support a first optical mode, in the first element; and patterning a surface in the first element; forming an intermediate element and defining an intermediate waveguide supporting an intermediate optical mode in the intermediate element; planarizing a top surface of the first element; forming a second element on the planarized top surface; defining a passive waveguide configured to support a second optical mode in the second element, and positioned such that a top surface of the intermediate waveguide underlies a bottom surface of the passive waveguide; and forming electrical contacts in the first element. The intermediate waveguide in the intermediate element is tapered to facilitate transformation between the first and second optical modes if the first optical mode differs from the second optical mode by more than a predetermined amount. Relative positionings of the first, intermediate, and second and third elements are defined using lithographic alignment marks.

BRIEF DESCRIPTION OF THE DRAWINGS

FIG. 5 illustrates a process flow diagram of a method according to some embodiments of the present invention.

DETAILED DESCRIPTION

Figure 1:
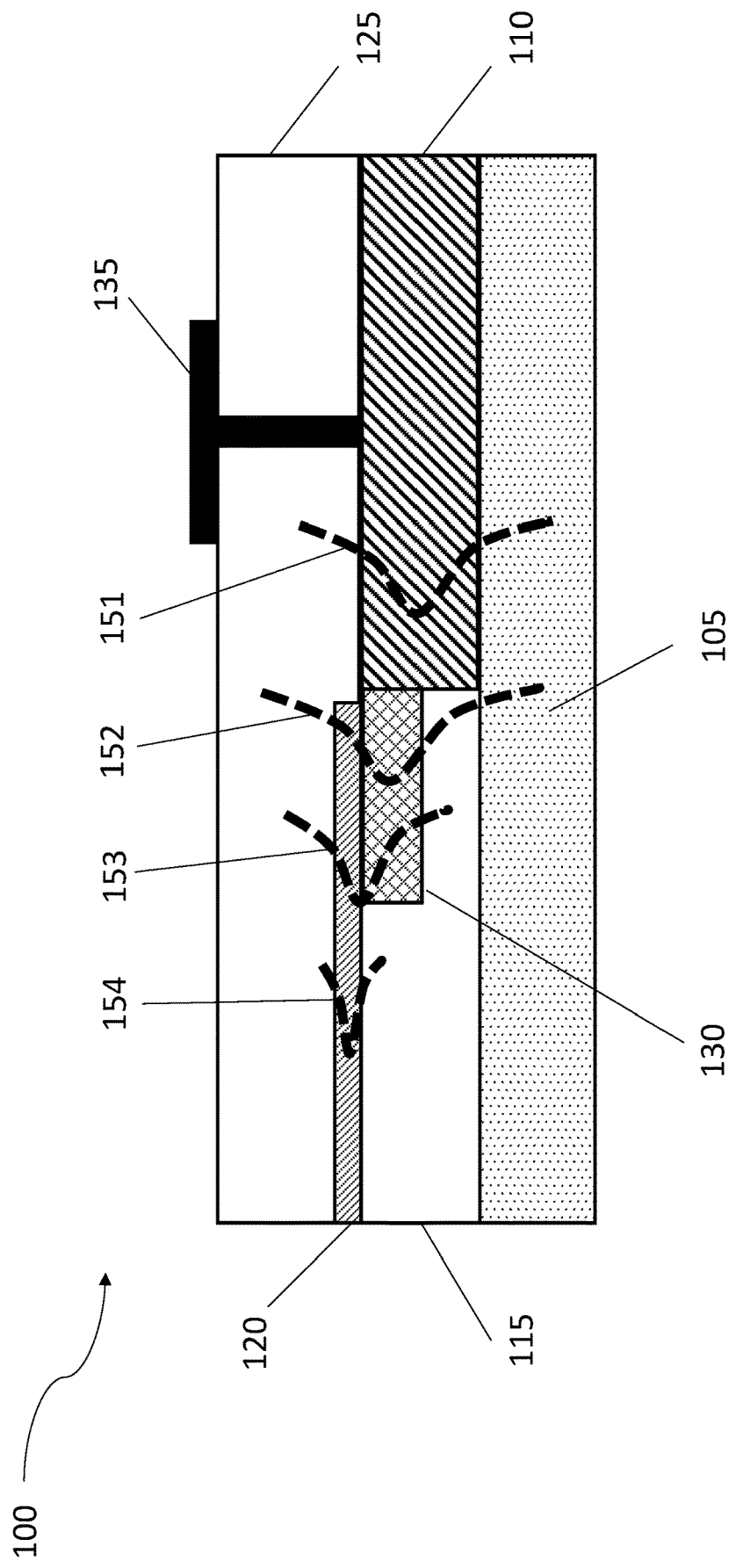
FIG. 1 illustrates a device according to one embodiment of the present invention, shown in cross-section.

Described herein include embodiments of a method and system for realization of photonic integrated circuits using epitaxial growth, wafer bonding and/or deposition of dissimilar materials where optical coupling is improved by use of mode conversion and a butt-coupling scheme.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" means that two or more elements are in direct contact in at least part of their surfaces. The term "butt-coupled" is used herein in its normal sense of meaning an "end-on" or axial coupling, where there is minimal or zero axial offset between the elements in question. The axial offset may be, for example, slightly greater than zero in cases where a thin intervening layer of some sort is formed between the elements, as described below with regard to e.g. elements 240 and 290 in FIG. 2. It should be noted that the axes of two waveguide structures or elements need not be colinear for them to be accurately described as being butt-coupled. In other words, the interface between the elements need not be perpendicular to either axis. Device 250, shown in FIG. 2 discussed below, is one example of such possibilities.

The terms "active device" and/or "active region", may be used herein. A device or a region of a device called active is capable of light generation, amplification, modulation and/or detection. We use active device and active region interchangeably meaning either one of them and/or both. This is in contrast to "passive device" and/or "passive region" whose principal function is to confine and guide light, and or provide splitting, combining, filtering and/or other functionalities that are commonly associated with passive devices. Some passive devices can provide functions overlapping with active device functionality, such as e.g. phase tuning implemented using thermal effects or similar that can provide modulation. The difference in this case is in performance, with active devices generally providing higher efficiencies, lower power consumption, larger bandwidth and/or other benefits. No absolute distinction should be assumed between "active" and "passive" based purely on material composition or device structure. A silicon device, for example, may be considered active under certain conditions of modulation, or detection of short wavelength radiation, but passive in most other situations.

FIG. 1 is a schematic cross-section view of an integrated photonic device 100 utilizing butt-coupling and mode conversion for efficient coupling between dissimilar materials. The device includes a substrate 105 that can be any suitable substrate for semiconductor epitaxial growth and/or integration, such as Si, InP, GaAs, GaN, quartz, silicon-on-insulator, sapphire or other materials known in the art. Such integration, aside from direct epitaxial growth, can include, but is not limited, to bonding of semiconductor material to substrate and/or bonding of template on which subsequently semiconductor material is grown. Substrate 105 can comprise multiple layers providing additional functionality such as buffer layers typically used to improve the quality of grown films and reduced density of defects. Substrate 105 can also comprise various dielectric or semiconductor layers providing optical cladding functionality, optical filtering and/or reflection functionality (typically realized as multilayer structures as is known to one skilled in the art) and/or others. In some embodiments, substrate 105 is transparent in the operating wavelength range, e.g. quartz when the PIC operates in visible or longer wavelength range.

Layer 110 is epitaxially grown, bonded, otherwise deposited and/or transferred on top of substrate 105 and can be made up of materials including, but not limited to, InP and InP-based ternary and quaternary materials, GaAs and GaAs based ternary and quaternary materials, GaN based ternary and quaternary materials, GaP, InAs and InSb and their variations and derivatives. Layer 110 in one embodiment is multilayered, comprising layers providing both optical and electrical confinement as well as electrical contacts, as is known in the art for active devices. In yet another embodiment, layer 110 uses substrate 105 to provide electrical and/or optical confinement and one or more electrical contacts. In one embodiment, materials grown in layer 110 can be of the same (native) material system to substrate 105 (e.g. GaN substrate and GaN based active layer) or they can be grown on different material systems (e.g. sapphire substrate and GaN based active layer). Growth on non-native systems can be beneficial economically (e.g. lower cost wafers and/or larger wafers in different material system such as e.g. Si or sapphire), can provide additional functionality (e.g. transparency) and/or have other benefits. Layer 110 is processed to form optical and/or electrical confinement and other elements needed for defining an active structure as is commonly done in the art. In some embodiments, frequency selective surfaces such as e.g. gratings are formed. Such structures in one embodiment are used to define single frequency lasers such as distributed feedback (DFB) or distributed Bragg reflector (DBR) lasers. The processing includes standard techniques such as photolithography and/or other methods of patterning, dry and wet etches, chemical-mechanical polishing (CMP), depositions and/or other techniques. Layer 110 can be completely removed in some parts of the structure as shown in FIG. 1 or parts of layer 110 can be preserved (not shown).

Layer 115 is deposited and/or grown, after the deposition/growth and patterning of layer 110, using techniques known in the field. In one embodiment, the material of layer 115 may include, but is not limited to, one or more of SiN, TiO2, Ta2O5, SiO2, and AlN. In some embodiments, other common dielectric materials may be used for layer 115. In other embodiments, a semiconductor material is used for layer 115. In one embodiment, the effective refractive index of material comprising layer 115 is lower than that of layer 130 (to be described later). Due to the patterning of layer 110, prior to deposition/growth of layer 115, in one embodiment, the deposited or grown layer 115 has a non-planar upper surface, the non-planarity of which is reflective of the non-planarity of the surface on which 115 is deposited or grown, a juxtaposition of underlying layers 105 and 110.

After layer 115 has been deposited or grown, the top surface of one or both of layers 115 and 110 may be planarized by chemical mechanical polishing (CMP) or other etching, chemical and/or mechanical polishing methods. In one embodiment, also shown in FIG. 1, the planarization completely removes any parts of the layer 115 that remain on top of layer 110. In other embodiments (not shown), a thin extension of layer 115 may be left on top of layer 110 after such polishing. In other embodiments, the smooth, even planarity of the top surface of layer 115 occurs automatically because of the intrinsic nature of the method by which layer 115 is deposited, for example if the material of layer 115 is a spin-on glass, polymer, photoresist or other suitable material. The term "planarized" is defined herein as applying equally to surfaces that are intrinsically smooth at a level typically achieved with a planarization step (e.g. CMP processes with <5 nm of local RMS roughness, where variations might be larger at wafer scale level) or have been polished by means as described above to render them smooth to that level.

Layer 115 is patterned and removed in a region into which layer 130 is subsequently deposited. Whether or not planarization of the top surface of layer 115 is achieved before the deposition of layer 130, it is important that planarization is achieved after that deposition, so that layer 120 (to be described below) has a smooth underlying interface. Layer 130 in one embodiment has higher refractive index than layer 115 (e.g. layer 130 can be silicon-oxynitride while layer 115 can be silicon-dioxide or other combinations of suitable materials). Layer 130 is butt-coupled to layer 110 either directly, or with a thin intervening layer between 130 and 110, providing coating functionality (not shown in FIG. 1 but explained in relation to FIG. 2 and elements 240 and/or 290). The coating typically provides high-reflectivity, anti-reflection and/or passivation functionality. The interface between 130 and 110 can be angled (meaning at an angle other than 90 degrees relative to a waveguide axis) to further optimize reflection as described below with respect to FIG. 2, which shows one such case. The top surface of layer 130 may be intrinsically planarized or may be deliberately planarized, as discussed above regarding layer 115. In either of these two cases, layer 115 has a planarized top surface[1], whereas layer 130 may have or may not have a planarized surface.

[1] Whether performed in one step (after the deposition/growth of layer 130) or in two steps (before and after the deposition/growth of layer 130)

Layer 120 is deposited on top of a planar top surface that includes the planar top surface of layer 115 but may also include one or both of planar top surfaces of layers 130 and 110. In one of the embodiments, the refractive index of layer 120 is larger than the refractive index of layer 115. Layer 120 can be patterned to provide waveguiding and/or other common functionality implemented in passive devices such as power splitting, wavelength splitting, filtering, tuning (e.g. thermal), adjusting the mode shape for e.g. fiber coupling and/or others.

The upper cladding layer 125 for waveguides realized in 120 and/or 130 can be ambient air (meaning no cladding material is actually deposited) or can be any other deliberately deposited suitable material as shown in FIG. 1, including, but not limited to, a polymer, SiO2, SiNx, etc. Layer 125 can also provide cladding functionality to layer 110 and/or support the deposition of electrical contacts 135. In the embodiments shown in FIG. 1, only one contact is shown, but it is clear that devices generally have one or more contacts that can be realized on a top surface as shown in FIG. 1 but may also involve using the substrate and/or any other suitable architecture, as would be well known in the field.

Layer 130 serves as an intermediate waveguide that in some embodiments accepts the profile (depicted by dashed line 151) of an optical mode supported by the waveguide primarily defined in layer 110, captures it efficiently as mode profile 152, and gradually transfers it to mode profiles 153, and finally 154. Mode profile 154 is then efficiently coupled to the waveguide for which layer 120 provides the core. In other embodiments, the direction of travel may be reversed, with layer 130 efficiently transforming optical mode 154, supported by the waveguide for which layer 120 provides the core, to that of a mode 151, supported by the waveguide primarily defined in layer 110. The refractive index of layer 130 can be engineered to facilitate efficient coupling of mode profile 151, via a butt-coupling mechanism, and to efficiently transform the mode to one with mode profile 154, by taking the advantage of tapered structures made in layer 120 and/or 130. Prior to the present invention i.e. in the absence of intermediate layer 130, the requirements on taper tip width for direct transfer from mode 151 to 154 would be problematic. The use of intermediate layer 130, however, significantly reduces the stringent requirements on taper tip width, allowing efficient transfer between very high refractive index materials (such as e.g. GaAs or GaN in layer 110) to low refractive index materials (such as e.g. SiN, SiO2 in layer 120). Yet another advantage of this coupling scheme is the ability to efficiently capture modes 151 whose center is significantly offset in vertical direction from the center of mode 154, which is very challenging utilizing only tapered structures.

It is to be understood that optical coupling between modes in layer 110 and layer 120 is reciprocal, so that, taking FIG. 1 as exemplary, the structure can be configured to facilitate light transmission from region 110 to region 120 as explicitly shown, but also to facilitate transmission in the reverse direction, from region 120 to region 110. It is to be understood that multiple such transitions with no limitation in their number or orientation can be realized on a suitably configured PIC.

Figure 2:
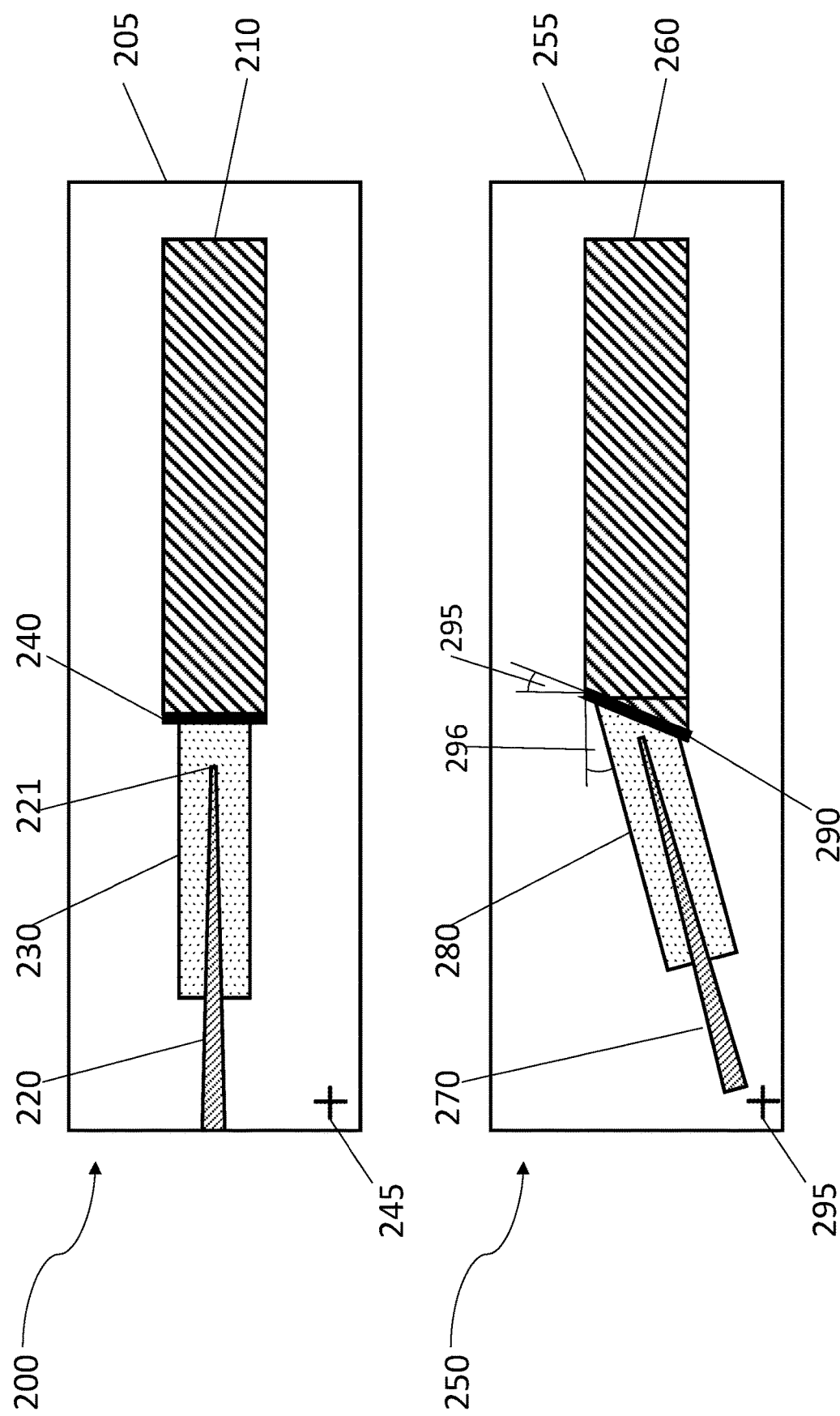
FIG. 2 illustrates two devices according to two corresponding embodiments of the present invention, shown in top-down view.

FIG. 2 depicts a top-down view of a device 200 according to one embodiment of the present invention where boundaries between dissimilar materials are perpendicular to the direction of propagation and a top-down view of a device 250 according to one embodiment of the present invention where boundaries between dissimilar materials are angled (non-perpendicular) relative to propagation directions, to control both the transmission and back reflection. One or more lithography alignment marks 245/295 are present to facilitate precise alignment between the layers formed during various processing steps.

Functional layers 205/255 correspond to functional layer 105 in FIG. 1. Functional layers 210/260 correspond to functional layer 110 in FIG. 1. Functional layers 220/270 correspond to functional layer 120 in FIG. 1. Functional layers 230/280 correspond to functional layer 130 in FIG. 1.

In the embodiment shown in 200, there is an optional layer 240 deposited at the interface between 210 and 230. Optional layer 240 (and optional layer 290 in device 250) primarily serves as either an anti-reflective or a highly reflective coating at the interface between layer 210 and layer 230. Layer 240 can also serve as a passivation layer for the facet/sidewall of layer 210. Layer 230 serves as an intermediate waveguide that facilitates efficient coupling between modes supported by waveguide whose core is formed by layer 220 and waveguide formed in layer 210 as explained with the help of FIG. 1. The dimensions of layer 220 can be tapered as illustrated with a taper tip 221. In other embodiments, the width of 230 can be tapered while width of 220 is kept constant. In yet another embodiment, both widths (of 220 and 230) can be adjusted to facilitate more efficient optical coupling. The requirements on the dimensions of the taper tips are relaxed with proper choice of materials allowing for mass fabrication using standard lithography tools. Tapers might terminate before the actual interface (as shown in e.g. 200 where 221 terminates before the interface with layer 240), can terminate at interface (not shown) and/or extend past the interface (not shown).

In the embodiment shown in 250 one or more of the interfaces between layers 260, 290, 280, and/or 270 are angled to reduce corresponding back reflection(s). The angle 295 defines the angle between the normal to the direction of propagation of the wave inside structure 260 and the facet/interface with layer 290 (and/or 280 if layer 290 is not present). In some embodiments the angle varies between 1° and 45°. In some embodiments, the angle is substantially equal to 8°.

The angle 296 defines the angle between the direction of the propagation of the wave inside the structure 260 and the angle of the waveguide formed by 280. The angle is an optimization parameter for coupling efficiency and is related to the choice of the angle 295, refractive indices of the materials used and/or other parameters. In one embodiment it is substantially equal to 0°. In yet another embodiment it is between 1° and 45°. In yet another embodiment it is substantially equal to 8°.

The magnitude of any lateral offset or misalignment between the axis defined by the direction of the propagation of the wave inside the structure 260 and the center of the waveguide 280 at the interface to 260, and/or 290 is an optimization parameter where such offset can be positive (in an "upward" direction as viewed in FIG. 2), negative (down in FIG. 2) and/or substantially equal to 0 (no offset). Such optimization is straightforward to perform with numerical software to maximize the performance of the transition.

Figure 3:
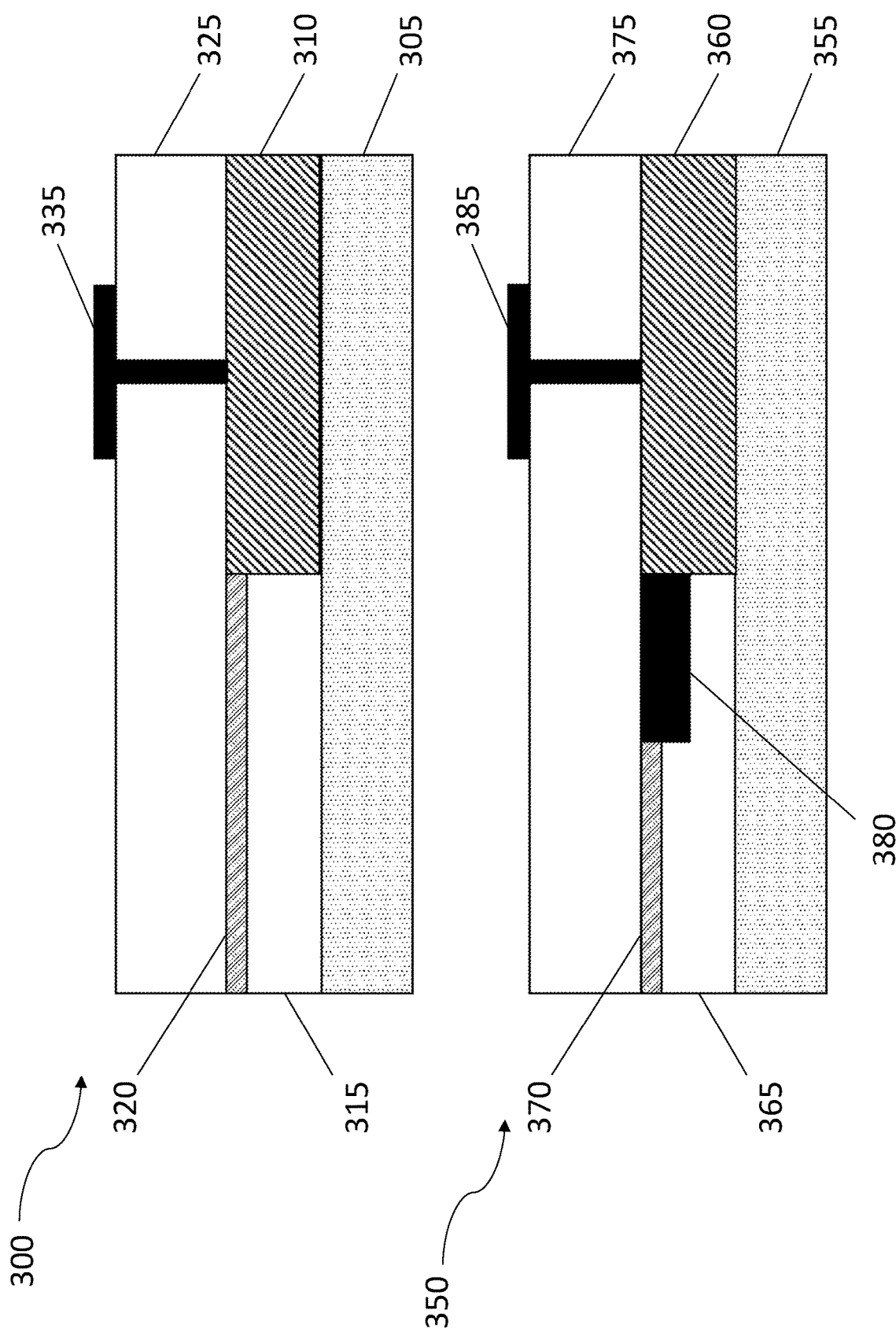
FIG. 3 illustrates two devices according to two corresponding embodiments of the present invention, shown in cross-section.

FIG. 3 shows two schematic cross-section views of some embodiments of an integrated photonic device utilizing butt-coupling and mode conversion for efficient coupling between dissimilar materials. Functional layers 305/355 correspond to functional layer 105 in FIG. 1. Functional layers 310/360 correspond to functional layer 110 in FIG. 1. Functional layers 315/365 correspond to functional layer 115 in FIG. 1. Functional layers 325/375 correspond to functional layer 125 in FIG. 1. Functional layers 335/385 correspond to functional layer 135 in FIG. 1.

In one embodiment, an integrated photonic device 300 deposits only layer 320 that serves dual functionality: (1) to provide efficient butt-coupling of optical modes supported by layer 310 to optical modes supported by waveguides defined in layer 320 (effectively providing the functionality of layer 130 in FIG. 1) and (2) provide all the passive functionality provided by equivalent layer 120 in FIG. 1. This dual functionality is provided with no intermediate deposited layers.

In yet another embodiment, an integrated photonic device 350 deposits both layers 370 (corresponding to functional layer 120 in FIG. 1) and 380 (corresponding to functional layer 130 in FIG. 1) such that their top surfaces are aligned and planarized in a single planarization step. Their top surfaces can also be aligned with top surface of layer 360 (as shown in 360) or can be at a different height than the top surface of 360 (not shown). In such a case (not shown), either one or both of layers 370 and/or 380 cover at least parts of layer 360 top surface. Layer 370, as in the shown embodiment, can terminate at the interface with layer 380. In another unshown embodiment, layer 370 may extend inside the layer 380, as mentioned above with respect to taper embodiments related to the shown FIG. 2 embodiment.

Figure 4:
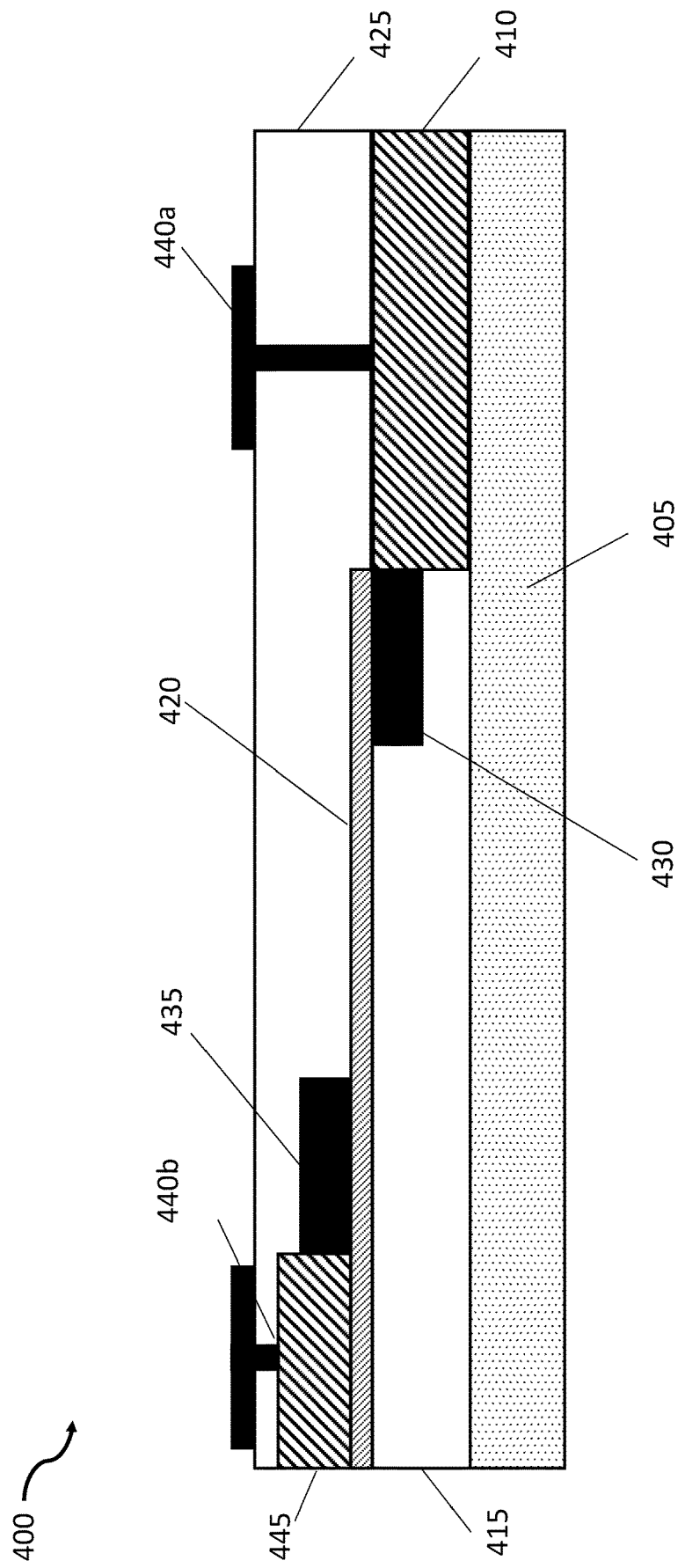
FIG. 4 illustrates a device according to one embodiment of the present invention, shown in cross-section.

FIG. 4 is a schematic cross-section view of an integrated photonic device 400 utilizing butt-coupling and mode conversion for efficient coupling between dissimilar materials supporting integration of two or more active materials, with an intervening passive waveguide structure.

Consider the right-hand side of the figure first. Functional layer 405 corresponds to functional layer 105 in FIG. 1. Functional layer 410 corresponds to functional layer 110 in FIG. 1. Functional layer 415 corresponds to functional layer 115 in FIG. 1. Functional layer 420 corresponds to functional layer 120 in FIG. 1. Functional layer 430 corresponds to functional layer 130 in FIG. 1. This part of device 400 therefore enables efficient coupling between waveguides 410 and 420 in the same way as device 100 enables efficient coupling between waveguides 110 and 120.

Now consider the left-hand side of the figure. The layer structure shown here is similar to structures described in U.S. Pat. No. 1,071,889. It begins with one or more active layers 445, in this case bonded to the top surface of layer 420, after layer 420 has been deposited and patterned. The bonding can be direct molecular bonding or can use additional materials to facilitate bonding such as e.g. metal layers or polymer films as is known in the art. Typical materials from which layer 445 is made include, but are not limited to, InP and InP-based ternary and quaternary materials, GaAs and GaAs based ternary and quaternary materials, GaN, GaP, InAs and InSb and their variations and derivatives.

Layer 445 in one embodiment is multilayered, comprising sub-layers providing both optical and electrical confinement as well as electrical contacts, as is known in the art for active devices. The sub-layers generally provide vertical confinement. In yet another embodiment, layer 445 uses lower layers 415 and/or 420 to provide electrical and/or optical confinement and one or more electrical contacts. Horizontal confinement, in one of the embodiments, is provided by defining a ridge type structure into layer 445. Horizontal confinement can also be provided by generating a strip structure, by implants or other techniques in the field. In either case, the intent of confinement structures is to control the position and shape of the optical mode and optimize the interaction between the optical mode and injected, generated and/or depleted carriers.

Layer 435 serves as an intermediate waveguide that facilitates efficient coupling between modes supported by waveguide whose core is formed by layer 420 and waveguide formed in layer 445 similarly to coupling from layer 110 to layer 120 as explained with the help of FIG. 1. Therefore, embodiments of the type shown in FIG. 4 enable efficient coupling not only between waveguides formed in layer 410 and layer 420 but also between waveguides formed in layer 420 and layer 445.

In some embodiments, layer 445 can be efficiently electrically pumped to generate optical emission and gain. Efficient coupling is facilitated by layer 435. An optional layer (not shown) can serve as an anti-reflective or a highly-reflective coating at the interface between layer 445 and layer 435 (similarly to layers 240/290 described in relation to FIG. 2). The optional layer can also serve as a passivation layer for the facet/sidewall of layer 445, Layer 435 may comprise a dielectric, a polymer and/or any other suitable material. The upper cladding layer 425 for waveguides realized in 420, 430 and/or 435 can be ambient air (meaning no cladding material is actually deposited) or can be any other deliberately deposited suitable material including, but not limited to, a polymer, SiO2, SiNx, etc. Layer 425 can also support electrical contacts 440a and/or 440b deposition. In the embodiments shown in FIG. 4, only one contact per active region is shown, but it is clear that devices generally have one or more contacts that can be realized on a top surface as shown in FIG. 4 but may also involve using the substrate and/or any other suitable architecture, as would be well known in the field.

The dimensions of layer 420 can be tapered similarly as shown in FIG. 2 and illustrated with a taper tip 221. In certain embodiments, one or both of the waveguides defined in layers 420 and 435 are tapered (not shown). The requirements on the dimensions of the taper tips are relaxed with proper choice of materials allowing for mass fabrication using standard lithography tools.

FIG. 5 is a process flow diagram of a method according to some embodiments of the present invention, showing some of the operations carried out to make integrated devices of the types described above with respect to FIGS. 1 and 2, and a set of cross-sectional views of a corresponding integrated photonic device at certain points during fabrication.

Method 500 for making the devices need not always include all the functions, operations, or actions shown, or to include them in exactly the sequence illustrated by the sequence from blocks 505 through 540 as shown. In an exemplary case, however, to provide devices such as those discussed above with reference to FIG. 1, method 500 begins with block, 505, in which a substrate, suitably prepared for subsequent processing steps, is provided. Method 500 may then proceed from block 505 to block 510, where a first element, comprising one or more semiconductor material layers, is formed on the prepared substrate. The first element can be formed by an epitaxial growth technique such as metal organic chemical vapor deposition (MOCVD), molecular beam epitaxy (MBE) or some other growth technique known in the art, by bonding, or be otherwise deposited and/or transferred onto the top of the substrate. A cross-section illustrating one embodiment at block 510 of the method is shown by 555.

From block 510, method 500 may proceed to block 515 where waveguides and other optical components such as, but not limited to, detectors, amplifiers, optical sources and/or others are formed in first element by patterning, etching, deposition, and/or other techniques used in semiconductor processing. Block 515 can also include definition of metal contacts and other steps typically performed when processing active optical devices. During block 515, layer 115 is created. Layer 115, as a part of the first element, can provide various functionalities including optical confinement, surface passivation, thermal resistance optimization and/or others, but also serves to provide cladding functionality to the second element (to be described later).

From block 515, method 500 may proceed to block 520 in which the top surface of layer 115 may optionally be planarized. As discussed above, this may be achieved by depositing a layer of material on top of the partially fabricated device, and then, if the method of deposition does not intrinsically provide a planar top surface, carrying out a deliberate planarization process such as CMP. The planarization may be controlled to leave a layer of desired, typically very low, thickness on top of the active waveguide layer in the first element, or to remove all of the deposited material above the level of the top surface of the first element. A cross-section illustrating one embodiment at block 520 of the method is shown by 560.

The method proceeds to block 525, in which an intermediate element is formed over or above the substrate, typically by removing/etching parts in which a layer of an additional material (layer 130 in FIG. 1) is deposited. A cross-section illustrating one embodiment at block 525 of the method is shown by 565.

At block 527, planarization of at least one top surface in preparation for the deposition or growth of a second element is ensured. This may have already been partly achieved by the nature of the deposition method for layer 115, or by a deliberate planarization effort (such as CMP) after forming that layer, but in either case, the top surface of layer 115 at this stage of process 500 is planarized. In addition, the top surfaces of one or both layers corresponding to 130 and 110 in FIG. 1 may optionally be planarized.

The method proceeds to block 530, in which a second element is formed above the substrate, typically by depositing a layer (120 in FIG. 1) of an additional material as is known in the art. This layer, in some embodiments, can also be bonded onto a top surface of the first element. After forming the second element layer, the second element can be patterned to define waveguides and other optional structures, such as, but not limited to, couplers, filters, resonators, etc. A cross-section illustrating one embodiment at block 530 of the method is shown by 570.

The method proceeds to block 535, in which a top cladding is formed typically by depositing a layer of an additional material as is known in the art. A cross-section illustrating one embodiment at block 535 of the method is shown by 575.

Next, at step 540, electrical contacts may be formed/finalized. This step may itself contain multiple processing steps including etching, deposition, lift-off and/or others. In embodiments where the first element is used to provide a semiconductor light source and/or amplifier, these contacts are used to drive the light source to generate light. In embodiments where the first element is used to provide a photodetector, these contacts may be used to convey the photodetector output signals. A cross-section illustrating one embodiment at block 540 of the method is shown by 580.

Further processing of the various dielectric and/or semiconductor layers, and/or electrical contacts, and the addition and processing of index matching layers, upper cladding, bonding pads, etc may be performed as is known in the art.

Embodiments of the present invention offer many benefits. The integration platform enables scalable manufacturing of PICs made from multiple materials and capable of covering a wide wavelength range from visible to IR and handling high optical power compared to typical Si waveguide-based or InP waveguide-based PICs.

Previous approaches have generally used taper structures in order to transfer an optical mode from an active device to a passive device, where a width of compound semiconductor region is adiabatically tapered down to sub-micron size. However, a required width of the taper tip decreases rapidly to tens of nanometer sizes as the difference in refractive indices increases. The present invention deploys a butt coupling scheme to eliminate the need of a very small taper size in the compound semiconductor waveguide, which eases fabrication of such structures.

Other approaches have relied on die attachment of pre-fabricated optical active devices to passive waveguides. This requires very stringent alignment accuracy which is typically beyond what a typical die-bonder can provide. This aspect limits the throughput of this process as well as the performance of optical coupling.

This present invention utilizes a process flow consisting of epitaxial growth and typically wafer-bonding of a blanket piece of compound semiconductor and/or dielectric material on a carrier wafer and subsequent semiconductor fabrication processes as is known in the art. It enables an accurate definition of optical alignment between active and passive waveguides typically via a photo lithography step, removing the need for precise physical alignment. Photo lithography-based alignment allows for scalable manufacturing using wafer scale techniques.

In some embodiments the active region can utilize the substrate for more efficient thermal sinking, due to direct contact to the substrate with no dielectric in-between. In such embodiments, active region fully defines the optical waveguide in active region and transitions to passive region via the above-mentioned butt-coupling.

Embodiments of the optical devices described herein may be incorporated into various other devices and systems including, but not limited to, various computing and/or consumer electronic devices/appliances, communication systems, sensors and sensing systems.

It is to be understood that the disclosure teaches just few examples of the illustrative embodiment and that many variations of the invention can easily be devised by those skilled in the art after reading this disclosure and that the scope of the present invention is to be determined by the following claims.

The invention claimed is:

1. A device comprising:
first, second and third elements fabricated on a common substrate;
wherein the first element comprises an active waveguide structure supporting a first optical mode, the second element, fabricated on a planarized top surface of the first element, comprises a passive waveguide structure supporting a second optical mode, and the third element, at least partly butt-coupled to the first element, comprises an intermediate waveguide structure, positioned relative to the passive waveguide structure such that a top surface of the intermediate structure underlies a bottom surface of the passive waveguide structure;
wherein a high reflectivity coating layer is present between the active waveguide structure and the intermediate waveguide structure;
wherein, if the first optical mode differs from the second optical mode by more than a predetermined amount, a tapered waveguide structure in at least one of the second and third elements facilitates efficient adiabatic transformation between the first optical mode and the second optical mode; and
wherein mutual alignments of the first, second and third elements are defined using lithographic alignment marks.

2. A device comprising:
first, second and third elements fabricated on a common, substrate, top surfaces of the first, second and third elements being co-planar;
wherein the first element comprises an active waveguide structure supporting a first optical mode, the second element, fabricated on a planarized top surface of the first element, comprises a passive waveguide structure supporting a second optical mode, and the third element, at least partly butt-coupled to the first element, comprises an intermediate waveguide structure, positioned such that a top planarized surface of the intermediate waveguide structure is aligned with a top planarized surface of the passive waveguide structure;
wherein, if the first optical mode differs from the second optical mode by more than a predetermined amount, a tapered waveguide structure in at least one of the second and third elements facilitates efficient adiabatic transformation between the first optical mode and the second optical mode; and
wherein mutual alignments of the first, second and third elements are defined using lithographic alignment marks.

3. The device of claim 2,
wherein the butt-coupled interface between the active waveguide structure and the intermediate waveguide structure is angled.

4. The device of claim 2,
wherein the active waveguide structure in the first element comprises an optical source.

5. The device of claim 2,
wherein the active waveguide structure in the first element comprises a photodetector.

6. A device comprising:
first, second, third, fourth and fifth elements fabricated on a common substrate;
wherein the first element comprises an active waveguide structure supporting a first optical mode, the second element, fabricated on a planarized top surface of the first element, comprises a passive waveguide structure supporting a second optical mode, and the third element, at least partly butt-coupled to the first element, comprises an intermediate waveguide structure, positioned relative to the passive waveguide structure such that a top surface of the intermediate structure underlies a bottom surface of the passive waveguide structure;
wherein, if the first optical mode differs from the second optical mode by more than a predetermined amount, a tapered waveguide structure in at least one of the second and third elements facilitates efficient adiabatic transformation between the first optical mode and the second optical mode;

wherein the fourth element comprises a second active waveguide structure supporting a fourth optical mode, and the fifth element, at least partly butt-coupled to the fourth element, comprises a second intermediate waveguide structure;

wherein, if the fourth optical mode differs from the second optical mode by more than a predetermined amount, a tapered waveguide structure in at least one of the second and fifth elements facilitates efficient adiabatic transformation between the fourth optical mode and the second optical mode; and wherein mutual alignments of the first, second, third, fourth and fifth elements are defined using lithographic alignment marks.

7. The device of claim 6,
wherein at least one of the butt-coupled interface between the active waveguide structure and the intermediate waveguide structure, and the butt-coupled interface between second active waveguide structure and the second intermediate waveguide structure is angled.

8. The device of claim 6,
wherein the active waveguide structure in the first element comprises an optical source.

9. The device of claim 6,
wherein the active waveguide structure in the first element comprises a photodetector.

* * * * *